(12) United States Patent
Tsuruta et al.

(10) Patent No.: US 8,615,100 B2
(45) Date of Patent: Dec. 24, 2013

(54) SOUND PRODUCING DEVICE FOR VEHICLE

(75) Inventors: Makoto Tsuruta, Hekinan (JP);
Susumu Miyata, Anjo (JP); Masaru Tsuchiya, Toyota (JP)

(73) Assignee: Anden Co., Ltd., Anjo (JP)

( * ) Notice: Subject to any disclaimer, the term of this patent is extended or adjusted under 35 U.S.C. 154(b) by 17 days.

(21) Appl. No.: 13/494,127

(22) Filed: Jun. 12, 2012

(65) Prior Publication Data
US 2012/0328146 A1 Dec. 27, 2012

(30) Foreign Application Priority Data

Jun. 22, 2011 (JP) .................................. 2011-138497

(51) Int. Cl.
*H04R 1/02* (2006.01)

(52) U.S. Cl.
USPC ............ 381/389; 381/351; 381/189; 181/149

(58) Field of Classification Search
USPC ........... 381/189, 341, 351, 389, 150, 86, 335; 181/149, 152
See application file for complete search history.

(56) References Cited

U.S. PATENT DOCUMENTS

| 4,720,867 A * | 1/1988 | Imai et al. ....................... 381/86 |
| 4,860,367 A * | 8/1989 | Hook ............................. 381/341 |
| 4,876,723 A * | 10/1989 | Fang ............................. 381/182 |
| 5,637,840 A * | 6/1997 | Kim ............................... 181/152 |
| 2004/0062407 A1 * | 4/2004 | Ziegler et al. ................ 381/189 |
| 2008/0037818 A1 * | 2/2008 | Ierfone et al. ................ 381/389 |
| 2013/0187523 A1 * | 7/2013 | Miyata et al. ................ 312/229 |
| 2013/0189918 A1 * | 7/2013 | Miyata et al. ................ 454/254 |
| 2013/0223656 A1 * | 8/2013 | Iuchi ............................. 381/189 |

FOREIGN PATENT DOCUMENTS

| JP | A-2004-229340 | 8/2004 |
| JP | A-2006-101287 | 4/2006 |

* cited by examiner

*Primary Examiner* — Curtis Kuntz
*Assistant Examiner* — Joshua Kaufman
(74) *Attorney, Agent, or Firm* — Posz Law Group, PLC

(57) ABSTRACT

Sound generated by a sound emitting unit passes through a first sound passage defined between a first shielding board and a shielding cylinder and a second sound passage defined between a second shielding board and the shielding cylinder, and is emitted outside from a sound emitting hole defined in at least one of a case and a cover. The second shielding board and the shielding cylinder shield a space between the sound emitting hole and the first sound passage when the first sound passage is seen from the sound emitting hole.

5 Claims, 6 Drawing Sheets

SOUND PRODUCING DEVICE FOR VEHICLE

CROSS REFERENCE TO RELATED APPLICATION

This application is based on Japanese Patent Application No. 2011-138497 filed on Jun. 22, 2011 and Japanese Patent Application No. 2012-118880 filed on May 24, 2012, the disclosures of which are incorporated herein by reference in their entirety.

TECHNICAL FIELD

The present disclosure relates to a sound producing device for a vehicle.

BACKGROUND

JP-A-2006-101287 describes a sound producing device for a vehicle. The sound producing device includes a case, a sound emitting unit arranged in the case, and a cover that covers the case. A side of the unit, from which sound is emitted, is covered by the cover, and the cover has a sound emitting hole. The sound producing device is arranged in a front bumper of the vehicle. When the vehicle is washed using high-pressure water, the high-pressure water may pass through the sound emitting hole and collide with the sound emitting unit, so that the sound producing device further includes a shielding board. The shielding board is configured to receive the high-pressure water, and is fixed to the cover.

However, the shielding board may be sometimes ineffective if the high-pressure water comes from an oblique direction relative to the cover, while the shielding board can receive the high-pressure water coming perpendicularly to the front face of the cover. If the high-pressure water collides with the sound emitting unit, the sound emitting unit may be damaged by the high-pressure water.

Moreover, snow adhering to the cover may be pushed into the sound producing device through the sound emitting hole by wind pressure received when the vehicle is traveling. If the snow adheres to the sound emitting unit, the sound emitting unit may be damaged. Further, sound pressure or quality emitted from the sound producing device may be varied if the snow adheres to the sound emitting unit.

SUMMARY

It is an object of the present disclosure to provide a sound producing device that is restricted from having damage and variation in the sound pressure or quality.

According to an example of the present disclosure, a sound producing device for a vehicle includes a case, a sound emitting unit, and a cover. The case has a cylindrical part and a separation wall disposed in the cylindrical part to separate inside of the case into a first space and a second space. The separation wall has a through hole through which the first space and the second space communicate with each other. The sound emitting unit is arranged in the first space to close the through hole. The cylindrical part has an opening open to outside from the second space, and the cover covers the opening of the cylindrical part. The case has a shielding cylinder arranged in the second space to surround the through hole, and the shielding cylinder protrudes from the separation wall toward the cover. The cover has a first shielding board and a second shielding board. The first shielding board is arranged in the shielding cylinder to cover the through hole. A first sound passage is defined between the first shielding board and an inner circumference surface of the shielding cylinder, and sound generated by the sound emitting unit passes through the first sound passage. The second shielding board is arranged to oppose an opening of the shielding cylinder to cover the first sound passage. A second sound passage is defined between the second shielding board and an axial end of the shielding cylinder, and sound coming from the first sound passage passes through the second sound passage. At least one of the cylindrical part of the case and the cover has a sound emitting hole through which the sound coming from the second sound passage is emitted outside. The second shielding board and the shielding cylinder shield a space between the sound emitting hole and the first sound passage when the first sound passage is seen from the sound emitting hole.

Therefore, when the vehicle is washed using high-pressure water, the high-pressure water is received by the second shielding board and the shielding cylinder so that the high-pressure water is restricted from entering the first sound passage. Accordingly, the sound producing device is restricted from having damage and variation in the sound pressure or quality.

Further, if snow is pushed into the second space through the sound emitting hole by wind pressure generated when the vehicle is traveling, the snow is restricted from entering inside of the shielding cylinder, due to the shielding cylinder and the first shielding board. Accordingly, the sound producing device is restricted from having damage and variation in the sound pressure or quality.

For example, the sound emitting hole is located at the lowest position in the second space.

Thus, the water or snow entering the second space can be discharged outside with reliability.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiment

An embodiment will be described with reference to FIGS. 1-8. Up-and-down direction shown in FIG. 2A is defined when a sound producing device of the embodiment is mounted to a vehicle. The sound producing device is used as, for example, an alarm device for the vehicle, or a device that informs an approach of another vehicle.

Figure 1:
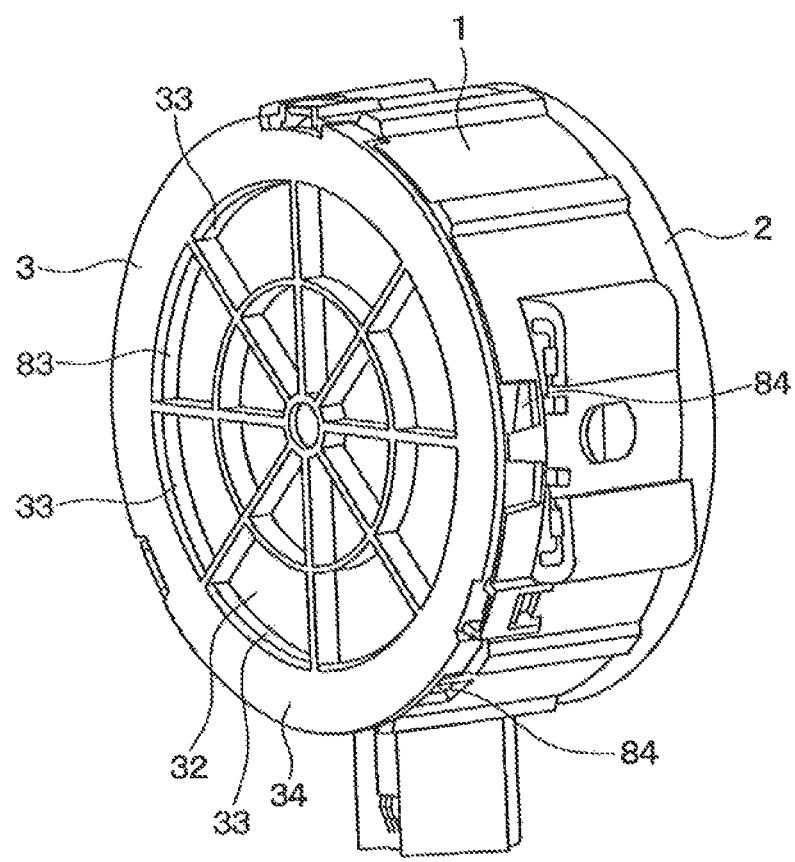
FIG. 1 is a perspective view illustrating a sound producing device according to an embodiment.
Figure 2A:
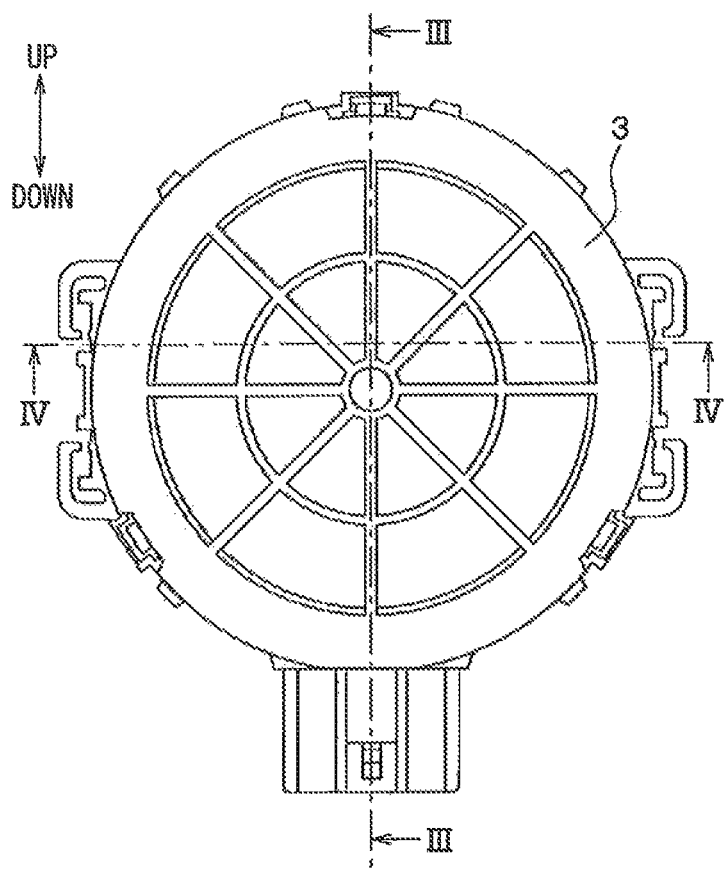
FIG. 2A is a front view illustrating the sound producing device.
Figure 2B:
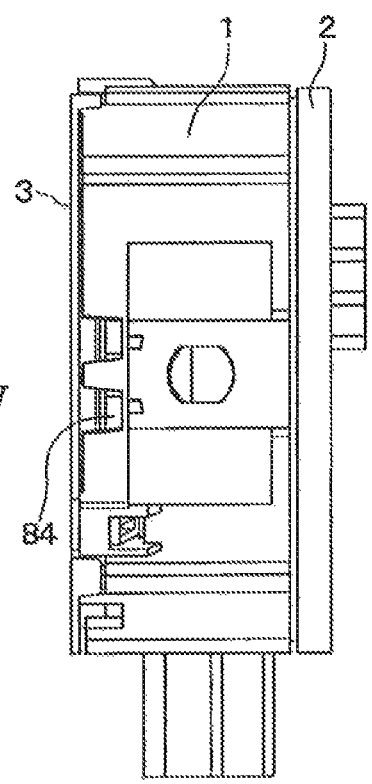
FIG. 2B is a side view illustrating the sound producing device.
Figure 2C:
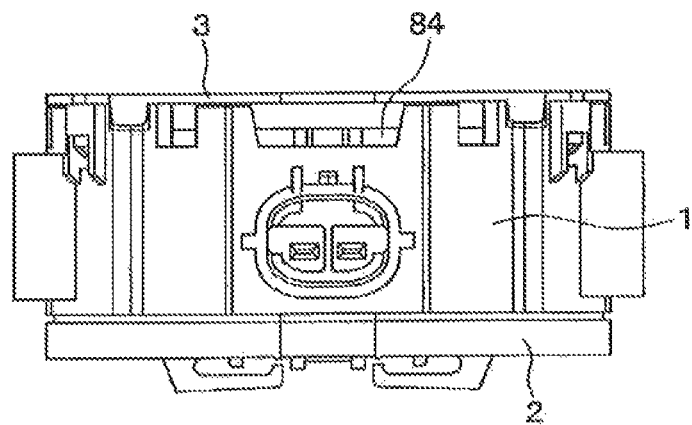
FIG. 2C is a bottom view illustrating the sound producing device.

As shown in FIG. 1, the sound producing device has a case constructed by a first casing 1, a second casing 2, and a cover 3. The first casing 1, the second casing and the cover 3 are made, of resin.

Figure 3:
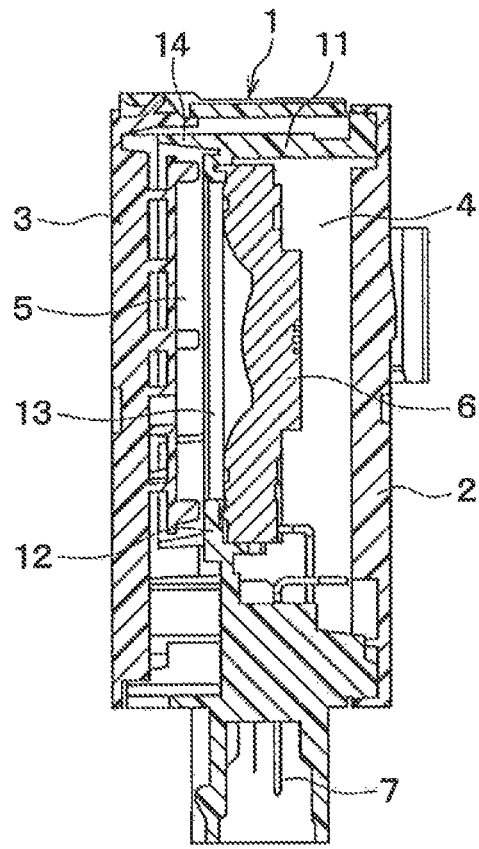
FIG. 3 is a cross-sectional view taken along a line III-III of FIG. 2A.
Figure 4:
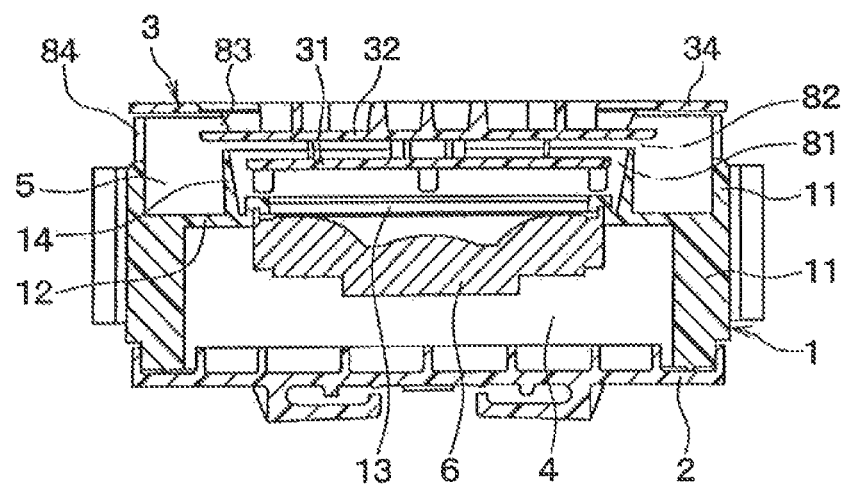
FIG. 4 is a cross-sectional view taken along a line IV-IV of FIG. 2A.

As shown in FIGS. 3 and 4, the first casing 1 has an approximately cylindrical portion 11 having a first opening and a second opening. The disc-shaped second casing 2 is gas-tightly coupled to the first opening of the cylindrical portion 11 using a welding, and the disc-shaped cover 3 is fitted to the first casing 1 to cover the second opening of the cylindrical portion 11.

A separation wall 12 is arranged in the cylindrical portion 11, and inside space of the cylindrical portion 11 is divided into two parts in the axis direction. Specifically, a first space 4 is defined by the cylindrical portion 11, the separation wall 12 and the second casing 2, and a second space 5 is defined by the cylindrical portion 11, the separation wall 12 and the cover 3.

Figure 5:
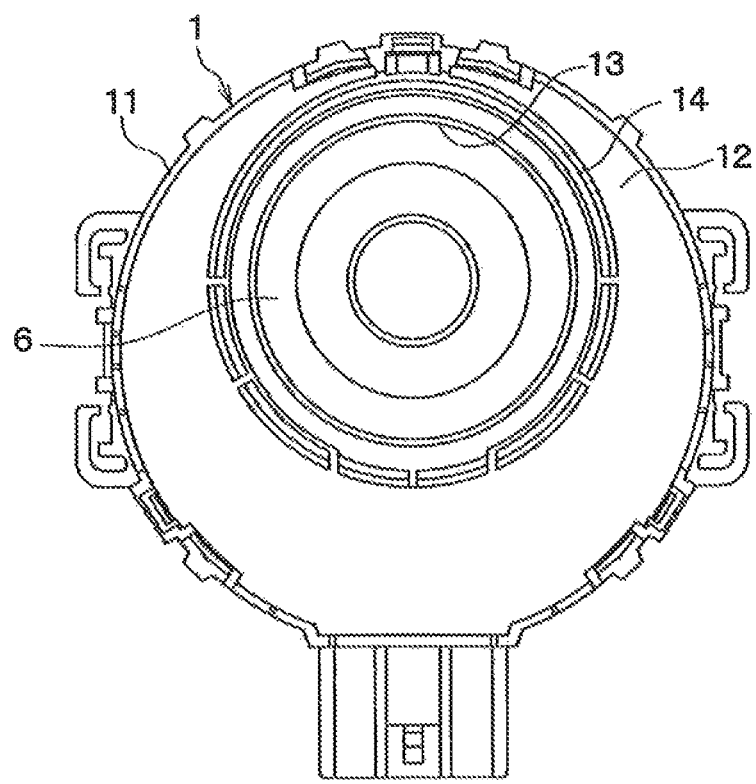
FIG. 5 is a front view illustrating the sound producing device without a cover.
Figure 6:
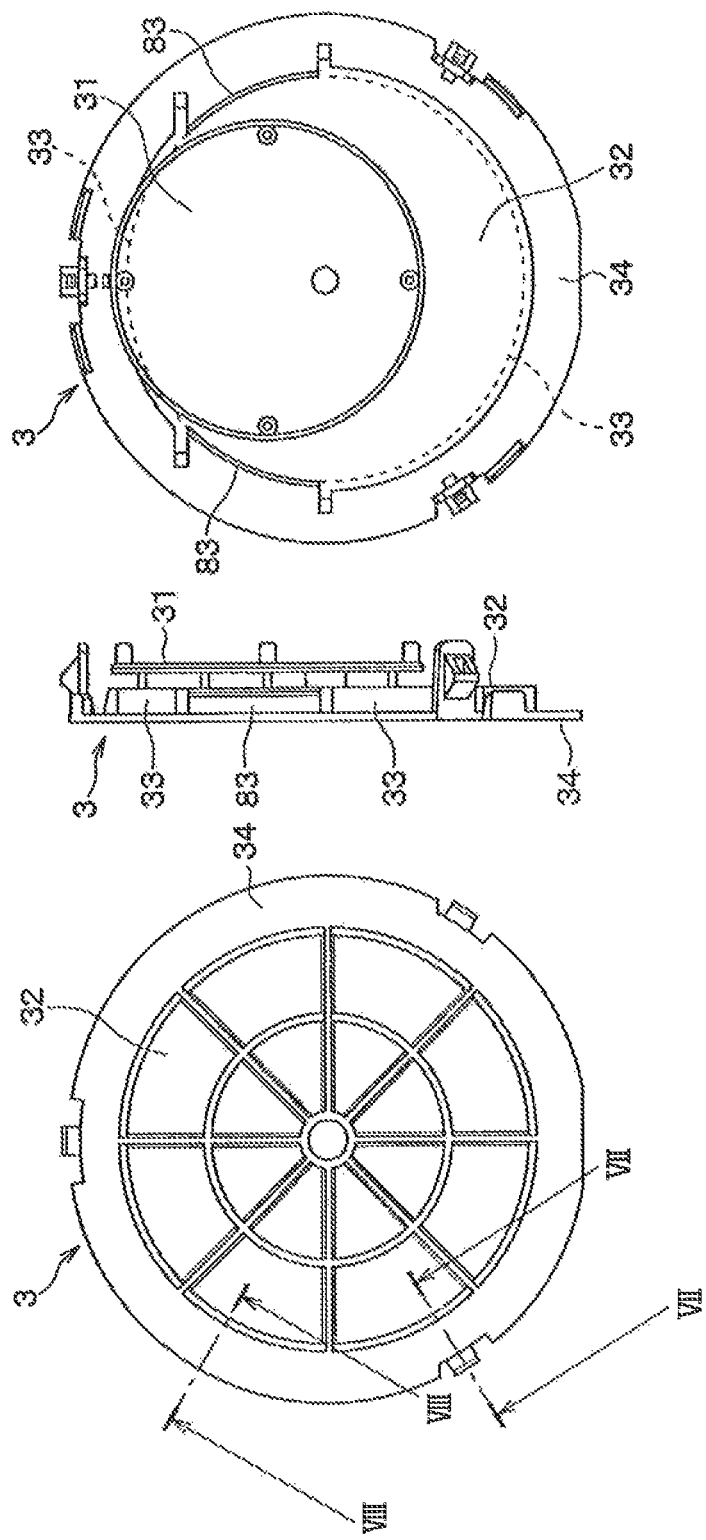
FIG. 6A is a front view illustrating the cover of the sound producing device.
FIG. 6B is a side view illustrating the cover of the sound producing device.
FIG. 6C is a back view illustrating the cover of the sound producing device.
Figure 7:
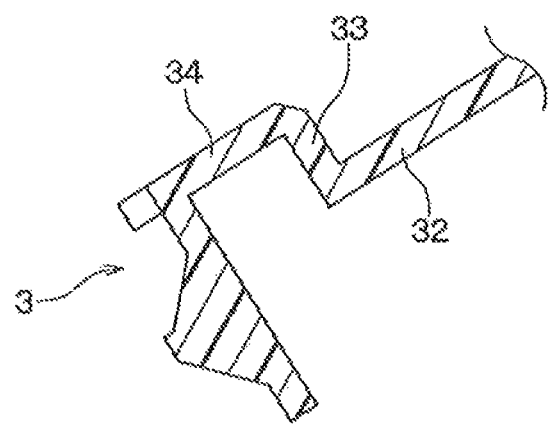
FIG. 7 is a cross-sectional view taken along a line VII-VII of FIG. 6A.
Figure 8:
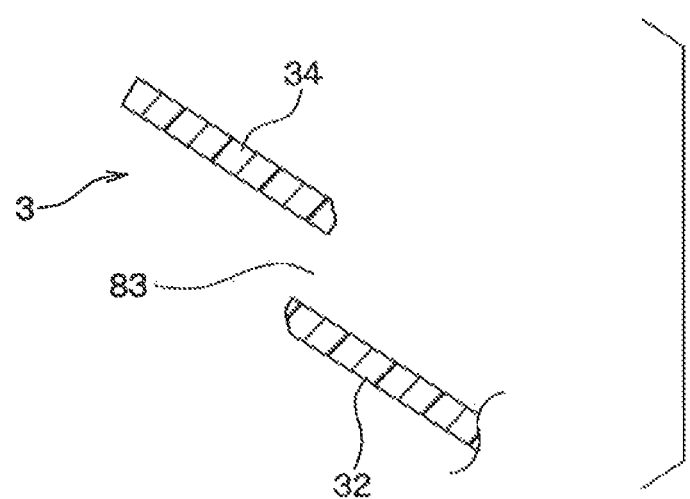
FIG. 8 is a cross-sectional view taken along a line VIII-VIII of FIG. 6A.

As shown in FIG. 5, the separation wall 12 has a round through hole 13 that causes the first space 4 and the second space 5 to communicate with each other. As shown in FIGS. 3 and 4, a sound emitting unit 6 is arranged in the first space 4 to close the through hole 13, and generates sound in response to an electric signal. The sound emitting unit 6 is gas-tightly connected to the separation wall 12 using a welding. As shown in FIG. 3, a connection terminal 7 is pressed into the first casing 1, and electrically connects the sound emitting unit 6 to an external harness (not shown).

As shown in FIG. 4, the first casing 1 has a shielding cylinder 14 that surrounds the through hole 13 and protrudes from the separation wall 12 toward the cover 3. The shielding cylinder 14 is arranged in the second space 5.

The cover 3 has a disc-shaped first shielding board 31 arranged in the shielding cylinder 14 to cover the through hole 13. More specifically, an axial end of the shielding cylinder 14 opposing to the cover 3 extends to a point between the first shielding board 31 and the cover 3, and the whole of the first shielding board 31 is received inside of the shielding cylinder 14 to produce a difference of level between the axial end of the shielding cylinder 14 and a surface of the first shielding board 31 relative to the second shielding board 32 in the axis direction. A first sound passage 81 is defined between an outer circumference surface of the first shielding board 31 and an inner circumference surface of the shielding cylinder 14, and sound generated by the sound emitting unit 6 flows through the first sound passage 81. The first sound passage 81 continuously extends along the circumference direction of the shielding cylinder 14.

The cover 3 has a disc-shaped second shielding board 32 arranged to oppose an axial opening of the shielding cylinder 14 to cover the first shielding board 31 and the first sound passage 81. The first shielding board 31 and the second shielding board 32 are arranged to be layered in the axis direction of the shielding cylinder 14. As shown in FIG. 6C, the diameter of the first shielding board 31 is smaller than the diameter of the second shielding board 32. The center of the first shielding board 31 is offset from the center of the second shielding board 32. More specifically, the first shielding board 31 is arranged to have the same axis as the sound emitting unit 6, and the center of the second shielding board 32 is offset from the center of the sound emitting unit 6.

A second sound passage 82 is defined between a surface of the second shielding board 32 and an axial end of the shielding cylinder 14. Sound passing through the first sound passage 81 is introduced into the second sound passage 82 that continuously extends along the circumference direction of the shielding cylinder 14.

As shown in FIGS. 1 and 4, the cover 3 has a cylinder portion 33 and a flange portion 34. The cylinder portion 33 extends from an outer circumference edge of the second shielding board 32 in the axis direction of the shielding cylinder 14 in a direction away from the second casing 2. The cylinder portion 33 has an axial end opposite from the second casing 2, and the flange portion 34 extends outward in the radial direction from the axial end of the cylinder portion 33.

The cylinder portion 33 of the cover 3 has a sound emitting hole 83 through which the sound passing through the second sound passage 82 is emitted outside. The sound emitting hole 83 is an opening defined by cutting a part of the cylinder portion 33 in the circumference direction. Specifically, in FIG. 1, left half of the cylinder portion 33 is separated into four parts in the circumference direction, and only the sound emitting hole 83 is the opening. Other three parts are closed. As shown in FIG. 6C, the sound emitting hole 83 is defined at two positions slightly upper side from the center section of the cylinder portion 33 in the up-and-down direction of FIG. 1.

The cylindrical portion 11 has a sound emitting hole 84 through which the sound passing through the second sound passage 82 is emitted outside. The sound emitting hole 84 is defined on an axial end part of the cylindrical portion 11 adjacent to the cover 3, as shown in FIG. 1. The sound emitting hole 84 is arranged at plural positions along the circumference direction of the cylindrical portion 11. One of the plural holes 84 is defined at the lowest position of the second space 5.

The sound emitting hole 83 of the cover 3 and the sound emitting hole 84 of the cylindrical portion 11 communicate with outside of the sound producing device. The sound output from the sound emitting unit 6 is emitted outside from the sound emitting hole 83 and the sound emitting hole 84.

Position relationship of the second shielding board 32, the first sound passage 81, and the sound emitting hole 83 will be described with reference to FIG. 4. When the first sound passage 81 is seen from the sound emitting hole 83, a space between the sound emitting hole 83 and the first sound passage 81 is shielded by the second shielding board 32, so that the sound emitting unit 6 cannot be recognized from outside of the sound generating device.

Position relationship of the second shielding board 32, the shielding cylinder 14, the first sound passage 81, and the sound emitting hole 84 will be described with reference to FIG. 4. When the first sound passage 81 is seen from the sound emitting hole 84, a space between the sound emitting hole 84 and the first sound passage 81 is shielded by the second shielding board 32 and the shielding cylinder 14, so that the sound emitting unit 6 cannot be recognized from outside of the sound generating device.

The sound producing device is arranged out of a passenger compartment of the vehicle. More specifically, the sound producing device is arranged in a front bumper of the vehicle in a manner that the cover 3 is located on the front side rather than the first casing 1 and the second casing 2. When electricity is supplied to the sound producing device, sound output from the sound emitting unit 6 passes through the first sound passage 81 and the second sound passage 82, and is emitted outside as a warning sound from the sound emitting hole 83 and the sound emitting hole 84.

When the vehicle is washed using high-pressure water, if the high-pressure water enters the second space 5 through the sound emitting hole 83 or the sound emitting hole 84, the high-pressure water is caught by the second shielding board 32, and is restricted from flowing into the first sound passage 81. The water received by the second shielding board 32 is discharged out of the sound producing device from the sound emitting hole 84 located at the lowest position in the second space 5. Therefore, water does not reach the sound emitting unit 6, so that the sound emitting unit 6 can be restricted from having damage. The second shielding board 32 has a predetermined dimension to restrict a foreign object such as high-pressure water or snow from having a direct contact with the sound emitting unit 6 by traveling linearly in the second sound passage 82 and the first sound passage 81 when the foreign object enters the second space 5 through the sound emitting hole 83, 84.

Moreover, if snow adhering to the surface of the cover 3 is pushed into the second space 5 through the sound emitting hole 83 or the sound emitting hole 84 by wind pressure generated when the vehicle travels, the shielding cylinder 14 and the first shielding board 31 restrict the snow from entering the shielding cylinder 14. The snow melts soon and is discharged out of the sound producing device from the sound emitting hole 84 located at the lowest position in the second space 5. Therefore, the snow does not reach the sound emitting unit 6, so that the sound emitting unit 6 can be restricted from having damage and functional disorder.

In the embodiment, the sound emitting hole 83 is defined in the flange portion 34 of the cover 3, and the sound emitting hole 84 is defined the cylindrical portion 11 of the first casing 1. Alternatively, the sound emitting hole may be defined at least one of the flange portion 34 of the cover 3 and the cylindrical portion 11 of the first casing 1.

Such changes and modifications are to be understood as being within the scope of the present disclosure as defined by the appended claims.

What is claimed is:

1. A sound producing device for a vehicle comprising:
   a case having a cylindrical part and a separation wall disposed in the cylindrical part to separate inside of the case into a first space and a second space, the separation wall having a through hole through which the first space and the second space communicate with each other, the cylindrical part having an opening open to outside from the second space;
   a sound emitting unit arranged in the first space to close the through hole; and
   a cover covering the opening of the cylindrical part, wherein
   the case has a shielding cylinder arranged in the second space to surround the through hole, the shielding cylinder protruding from the separation wall toward the cover,
   the cover has a first shielding board arranged in the shielding cylinder to cover the through hole, a first sound passage being defined between the first shielding board and an inner circumference surface of the shielding cylinder, sound generated by the sound emitting unit passing through the first sound passage, and a second shielding board arranged to oppose an opening of the shielding cylinder to cover the first sound passage, a second sound passage being defined between the second shielding board and an axial end of the shielding cylinder, sound coming from the first sound passage passing through the second sound passage, at least one of the cylindrical part of the case and the cover has a sound emitting hole through which sound coming from the second sound passage is emitted outside, and the second shielding board and the shielding cylinder shield a space between the sound emitting hole and the first sound passage when the first sound passage is seen from the sound emitting hole.

2. The sound producing device according to claim 1, wherein
   the sound emitting hole is located at the lowest position in the second space.

3. The sound producing device according to claim 1, wherein
   the sound emitting hole is one of a plurality of sound emitting holes,
   the cylindrical part of the case has a first sound emitting hole corresponding to the sound emitting hole, and
   the cover has a second sound emitting hole corresponding to the sound emitting hole.

4. The sound producing device according to claim 1, wherein
   the axial end of the shielding cylinder opposes to the cover and extends to a point between the first shielding board and the cover, and
   the whole of the first shielding board is received inside of the shielding cylinder to produce a difference of level between the axial end of the shielding cylinder and a surface of the first shielding board relative to the second shielding board in an axis direction of the shielding cylinder.

5. The sound producing device according to claim 1, wherein
   the first shielding board has a diameter smaller than a diameter of the second shielding board.

* * * * *

UNITED STATES PATENT AND TRADEMARK OFFICE
CERTIFICATE OF CORRECTION

| | | |
|---|---|---|
| PATENT NO. | : 8,615,100 B2 | Page 1 of 1 |
| APPLICATION NO. | : 13/494127 | |
| DATED | : December 24, 2013 | |
| INVENTOR(S) | : Makoto Tsuruta, Susumu Miyata and Masaru Tsuchiya | |

It is certified that error appears in the above-identified patent and that said Letters Patent is hereby corrected as shown below:

Title page

Item (30), correct the Foreign Application Priority Data

"Jun. 22, 2011 (JP) .............2011-138497" to

-- Jun. 22, 2011 (JP) .............2011-138497
   May 24, 2012 (JP) .............2012-118880 --

Signed and Sealed this
First Day of April, 2014

Michelle K. Lee
*Deputy Director of the United States Patent and Trademark Office*